United States Patent [19]

Delebarre et al.

[11] Patent Number: 4,968,492

[45] Date of Patent: Nov. 6, 1990

[54] DEVICE FOR FEEDING FLUIDIZING GAS TO THE OPENINGS IN A GRID FOR SUPPORTING A BED OF PARTICLES TO BE FLUIDIZED

[75] Inventors: Arnaud Delebarre, Lille; Paul V. Witwicki, Bethune, both of France

[73] Assignee: Charbonages de France, Rueil Malmaison, France

[21] Appl. No.: 394,645

[22] Filed: Aug. 16, 1989

[30] Foreign Application Priority Data

Aug. 19, 1988 [FR] France ............................. 88 11026

[51] Int. Cl.$^5$ .................. F27B 15/04; F27B 15/02
[52] U.S. Cl. ................... 422/311; 34/57 A; 110/245; 422/143
[58] Field of Search ............ 422/143, 311, 139; 34/57 A; 110/245

[56] References Cited

U.S. PATENT DOCUMENTS

| 2,715,565 | 8/1955 | McKay | 422/143 |
| 3,277,582 | 10/1966 | Munro et al. | 422/143 X |
| 3,746,516 | 7/1973 | Michaud | 422/143 X |
| 3,818,606 | 6/1974 | Marcellini | 34/57 A |
| 4,329,526 | 5/1982 | Bagley et al. | 34/57 A X |
| 4,347,672 | 9/1982 | Friedrichs | 34/57 A X |
| 4,674,564 | 6/1987 | Chrysostome et al. | 34/57 A X |

Primary Examiner—Robert J. Hill, Jr.
Assistant Examiner—Amalia Santiago
Attorney, Agent, or Firm—Cushman, Darby & Cushman

[57] ABSTRACT

The device for feeding fluidizing gas to the openings (1) in a fluidizing grid (2) comprises an end piece (4) fitted on each bottom inlet (3) to each opening (1) and having a length e lying in the range between 0 and 0.5 times the diameter d of the end piece, and a cup (5a) into which the end piece extends, with the bottom (6) of the cup being at a distance i from the end piece, which distance may optionally be adjustable. The entire device is housed in a fluidizing gas feed box (5).

5 Claims, 2 Drawing Sheets

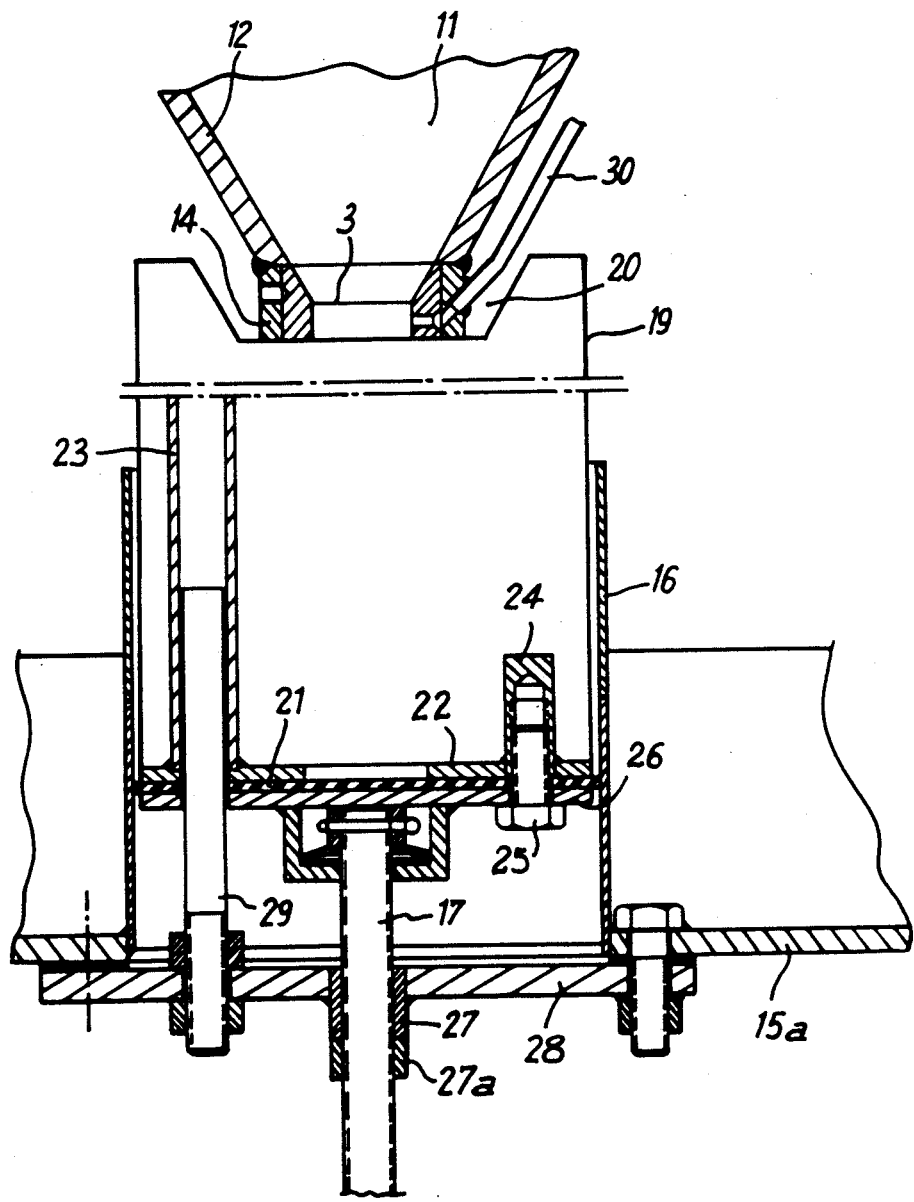

DEVICE FOR FEEDING FLUIDIZING GAS TO THE OPENINGS IN A GRID FOR SUPPORTING A BED OF PARTICLES TO BE FLUIDIZED

The present invention relates to a device for feeding a fluidizing gas to the openings in a grid for supporting a bed of particles to be fluidized.

BACKGROUND OF THE INVENTION

Some grids have fluidizing air injection openings which may become blocked by solid particles falling into them.

This applies in particular to grids in which the openings flare upwards, being in the form of truncated cones or of truncated pyramids, for example. Each time fluidization is stopped, these openings are obstructed by solid particles falling back onto the grid. Therefore, in order to fluidize the particles again, it is necessary to clear the openings by an operation referred to as "unclogging". The openings through the grid become obstructed because the pipe feeding injection gas to the grid includes either a bend or else a siphon in order to prevent the particles from penetrating into all of the injection pipework when fluidization is stopped.

Various devices have been used up to the present for unclogging. One such device consists in feeding each opening in the grid individually by means of a duct which includes a flow rate adjusting valve, a stop valve, a diaphragm, and siphon means for retaining poarticles. When accumulation occurs therein, the stop valve is closed and the accumulated particles are blown out by compressed air. These means are effective, but complicated and expensive.

Another known solution to this problem consists in placing an element in the injection pipe for retaining particles in one direction while allowing air to pass in the opposite direction. This element is simple but it introduces major headloss in the fluidization installation.

Finally, there exists a solution whereby unclogging is achieved by applying compressed air to the clogging mass via a small diameter pipe situated in the fluidizing orifice. This solution is effective, but it requires two feed networks for the fluidizing orifices and that constitutes a factor which increases cost.

The present invention seeks to provide a different solution to this problem of particles clogging the orifices in a fluidizing grid, which solution avoids the complexity of prior devices by making it possible to use the fluidizing gas for unclogging purposes.

SUMMARY OF THE INVENTION

To this end, the present invention provides a device for feeding fluidizing gas to a grid for supporting a bed of particles to be fluidized, the grid having injection openings each having a bottom inlet in communication with an injection gas feed box, and particle fall preventing means interposed between said bottom opening and the box in order to retain particles when operation is stopped, in which the fall preventing means is constituted by a cup disposed at a determined distance from, and facing, the bottom inlet preferably carried by an end piece whose height is no greater than half its diameter.

Each opening may be associated with an individual box, in which case the cup may be constituted by the bottom and side walls of the box itself. The height of the box is then determined by construction to obtain the determined distance between the bottom of the box and the free end of the end piece.

However, in a preferred embodiment, a plurality of end pieces extending the openings in the grid penetrate into a single fluidizing gas feed box. In this case, each cup may be carried facing each end piece by means of a piston mounted to slide in sealed manner inside a sleeve provided through the bottom wall of the box beneath the end piece, with the piston being fixed, for example, to an axial screw for adjusting its position and co-operating with a nut carried by the box, the screw having an operating head at its end outside the box. This disposition makes it possible to adjust the distance between each cup and end piece as a function of the nature of the particulate material to be fluidized.

BRIEF DESCRIPTION OF THE DRAWINGS

Embodiments of the invention are described by way of example with reference to the accompanying drawings, in which:

FIG. 3. is a detail view of FIG. 2 through a fluidizing opening.

DETAILED DESCRIPTION

Figure 1:
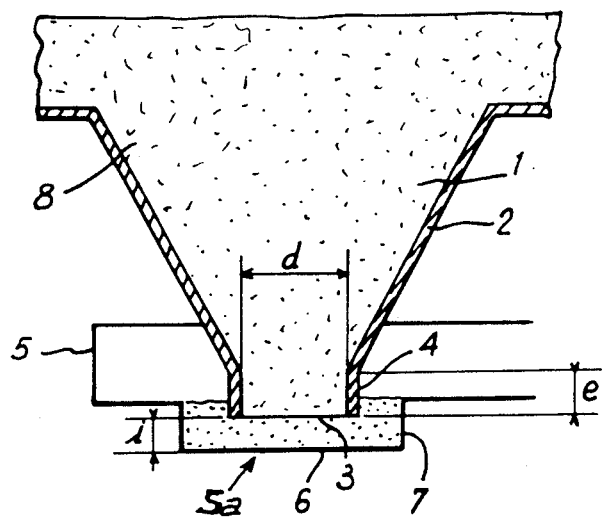
FIG. 1. is a diagram showing the basic characteristics of the invention.

FIG. 1. shows a fluidizing gas injection opening 1 provided in a grid 2 for supporting a particulate material to bse fluidized. In this case, the opening 1 is in the form of an truncated cone (or truncated pyramid) having a bottom inlet 3 for fluidizing gas. The inlet 3 is provided at the end of an end piece 4 of height e which is selected to be no greater than one half the diameter d of the opening 3. This end piece 4 penetrates into a gas feed box 5 whose bottom wall 5a is given a cup shape where it faces the free end of the end piece 4, i.e. it has a bottom wall 6 and side walls 7 delimiting a volume into which the end piece 4 extends. This constitutes a kind of siphon which prevents the particles from falling into the box 5 when fluidization is stopped. Reference 8 designates material accumulated in the opening 1 and blocked by this siphon.

If the walls of the injection opening are conical or pyramid-shaped, the end piece may be omitted and the small diameter end portion of the walls constituting the end piece directly. These dispositions make it possible to unclog accumulated substance using gas in the feed box at a pressure of the same order as that required for fluidizing purposes.

The distance i between the inlet 3 and the bottom wall 6 of the cup 5a has an effect on flow rate distribution, and by fixing its value experimentally, it is possible to obtain good fluidization balance.

By way of example, there follow the results of tests performed using various particulate materials of different grain sizes.

For headlosses as normally encountered in fluidizing grids, the distance i may lie in the range 5 millimeters (mm) to 20 mm when using inlets having a diameter of about 60 mm to 75 mm.

Thus, for an end piece (A) having a diameter d of 60 mm, a height e of 20 mm, and for a gap i of 15 mm, the following values were obtained for the pressure required for unclogging (pressure in hectopascals).

| Type of Solid | Depth of Solid in Millimeters | | | | | |
|---|---|---|---|---|---|---|
| | 200 | 300 | 400 | 500 | 600 | 700 |
| sand[1] | 80 | 103 | 138 | 164 | 197 | 237 |
| schists[2] | 118 | 189 | 224 | — | — | — |

[1]The grain size of the sand was less than 0.5 mm (with an average particle diameter of 0.28 mm) and its bulk density was 1.53 (it is recalled that the average particle diameter is a conventional characteristic for fluidized beds and is equal to the harmonic mean of the particle diameters).
[2]The schist had a grain size distribution such that the largest particle dimension was not more that 1 cm (average particle diameter 0.8 mm) with an average bulk density of 1.39.

For an inlet 3 of diameter d=75 mm and no end piece (B), with the gap i still being 15 mm, the following table of values was obtained (unclogging pressure in hectopascals):

| Type of Solid | Depth of Solid in Millimeters | | | | | |
|---|---|---|---|---|---|---|
| | 200 | 300 | 400 | 500 | 600 | 700 |
| schist[1] | 158 | 184 | — | — | — | — |
| schist[2] | 158 | 204 | — | — | — | — |
| schist[3] | 80 | 105 | 105 | 118 | 125 | 132 |

[1]This schist had the same grain size distribution as that of the preceding table.
[2]The grain size distribution was such that the largest particle dimension was not greater than 3.15 mm, with an average diameter of 0.482 mm, and an average bulk density 1.46.
[3]The grain size distribution was such that the largest dimension of a particle was not more than 1 mm, the average diameter was 0.217 mm, and the average bulk density 1.4

After unclogging, the pressure was established as follows (values in hectopascals):

| Nature of solid | End piece | Depth of solid in millimeters | | | | | |
|---|---|---|---|---|---|---|---|
| | | 200 | 300 | 400 | 500 | 600 | 700 |
| Schist (1) | B | 44 | 80 | | | | |
| Schist (2) | B | 37 | 80 | | | | |
| Schist (3) | B | 53 | 66 | 80 | 80 | 92 | 92 |
| Sand | A | 53 | 90 | 121 | 137 | 150 | 171 |
| Schist (1) | A | 80 | 84 | 110 | | | |

Pressure values after unclogging (hPa)

The results show that when unclogging occurs, the pressure which causes it is not more than about three times the fluidizing pressure.

Figure 2:
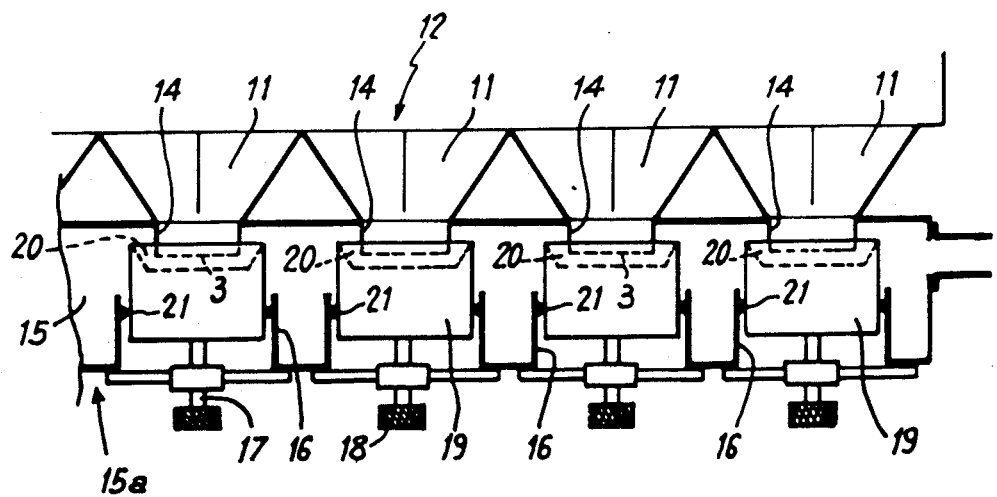
FIG. 2. is a fragmentary section view through a fluidizing grid fitted with the device of the invention.

FIG. 2. shows a plurality of openings 11 through a grid 12 fed with fluidizing gas from a sigle wind box or air feed box 15. The bottom 15a of the box includes tubular chimneys or sleeves 16 facing the end pieces 14 of each opening 11. Each of these sleeves contains a piston 19 whose position can be adjusted by means of a screw 17 rotated by a knob 18, with the top face 20 of each piston being cup-shaped. Each piston 19 slides in sealed manner inside its sleeve 16 by virtue of a sealing ring 21.

FIG. 3. is a more detailed view of one of the pistons 19 shown in its high position, i.e. engaging the bottom of the end piece 14. This figure reproduces items already described with reference to FIG. 2 and given the same reference numerals. The piston 19 is in the form of a hollow cylinder which is closed at its bottom end by a plate 22 forming a support for (three) tubular guides 23 and for tapped blind end pieces 24. These three end pieces receive fixing screws 25 for retaining a plate 26 and clamping a gasket 21. A threaded rod 17 is fixed to the plate 26 and is engaged in a stationary nut 27 fixed to the bottom 15a of the wind box by a support 28. A lock nut 27a serves to lock an adjusted position. A guide peg 29 is fixed to the support 28 to engage each of the tubular guides 23. The piston 19 is thus guided axially and prevented from rotating when the screw 17 is rotated. Finally, it should be observed that there is a nozzle 30 for monitoring the pressure at the end piece 14 or at the walls of the bottom inlet 3 to the injection opening if the height e of the end piece is too small or non-existent.

It can be seen that by rotating the rod 17, the distance between the end piece 14 and the bottom of the cup 20 can be adjusted so as to adapt the operating conditions of the grid to the nature of the substance to be fluidized, both with respect to unclogging and with respect to distributing and balancing the fluidizing gas flow rates. The pressure take-off point 30 provided at the end piece constitutes a simple means for verifying that each opening has indeed been unclogged. When an opening is clogged, the pressure therein is greater than atmospheric pressure and approximately equal to the delivery pressure of the fan. When unclogged, the pressure observed at the inside wall of the end piece is less than atmospheric pressure.

In conventional manner, obstruction of the pressure take-off by solids can advantageously be avoided by providing it with a filter, e.g. of porous material, or else by setting up air back-pressure therethrough.

We claim:

1. A grid for supporting a bed of particles to be fluidizied, having injection openings each having a bottom inlet in communication with an injection gas feed box and particle fall preventing means interposed between said bottom inlet and the box in order to retain particles when operation is stopped, said fall preventing means being constituted by a cup disposed at a determined distance from, and facing the bottom inlet of, the respective injection opening, wherein said cup is a part of the wall of the box itself which is adjustable in position relative to the bottom inlet of the respective injection opening.

2. A device according to claim 1, wherein said cup is carried by a piston slidably mounted in sealed manner in a sleeve provided in the bottom wall of the box facing the bottom inlet.

3. A device according to claim 2, wherein the piston is fixed to an axial screw for adjusting its position, said axial screw cooperating with a nut carried by the box, an operating head at an end of the axial screw outside the box.

4. A device according to claim 2, wherein the piston is axially guided and prevented from rotating by guide pegs fixed to the bottom wall of the box.

5. A device according to claim 1, wherein the bottom inlet of the injection opening is provided at the end of an end piece, which extends the injection opening over a height which is equal to not more than one half its inside diameter, said end piece including a pressure take-off means.

* * * * *